United States Patent
Morikawa

(10) Patent No.: US 9,473,672 B2
(45) Date of Patent: Oct. 18, 2016

(54) IMAGE READING APPARATUS, INCLUDING ABNORMAL PIXEL DETECTION, AND IMAGE READING METHOD

(71) Applicant: CANON KABUSHIKI KAISHA, Tokyo (JP)

(72) Inventor: Daisuke Morikawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/875,857

(22) Filed: Oct. 6, 2015

(65) Prior Publication Data

US 2016/0028922 A1    Jan. 28, 2016

Related U.S. Application Data

(63) Continuation of application No. 13/076,577, filed on Mar. 31, 2011, now Pat. No. 9,191,549.

(30) Foreign Application Priority Data

Apr. 2, 2010  (JP) ................................. 2010-086066

(51) Int. Cl.
*H04N 1/409* (2006.01)
*H04N 1/12* (2006.01)
(Continued)

(52) U.S. Cl.
CPC ........ *H04N 1/4097* (2013.01); *H04N 1/00013* (2013.01); *H04N 1/00023* (2013.01); *H04N 1/00037* (2013.01); *H04N 1/00039* (2013.01); *H04N 1/00087* (2013.01); *H04N 1/00092* (2013.01); *H04N 1/12* (2013.01);
(Continued)

(58) Field of Classification Search
None
See application file for complete search history.

(56) References Cited

U.S. PATENT DOCUMENTS

| 7,660,018 B2 | 2/2010 | Shimizu |
| 2002/0089707 A1 | 7/2002 | Yasuda |

(Continued)

FOREIGN PATENT DOCUMENTS

| JP | 2004-222180 A | 8/2004 |
| JP | 2005-045462 A | 2/2005 |
| JP | 2007-142671 A | 6/2007 |
| JP | 2008311963 A | 12/2008 |

OTHER PUBLICATIONS

Office Action issued in Japanese Patent application 2010-086066, dated May 13, 2013.

(Continued)

*Primary Examiner* — Andrew H Lam
(74) *Attorney, Agent, or Firm* — Rossi, Kimms & McDowell LLP

(57) ABSTRACT

An image reading apparatus capable of accurately detecting abnormal pixels caused by a contaminant such as dirt, stain, or flaw on a moving document reading glass being read. An image processing unit of the image reading apparatus performs a first abnormal pixel detection process to detect pixel signals representing abnormal pixels and output from image sensors for respective colors when a reading unit reads a guide plate in a main scanning direction in a state before an original passes through a moving document reading position, performs a second abnormal pixel detection process to detect pixel signals representing abnormal pixels and output from the image sensors when an original being conveyed is read by the reading unit in the main scanning direction, and detects a main scanning direction of abnormal pixels based on results of these detection processes.

8 Claims, 7 Drawing Sheets

(51) Int. Cl.
*H04N 1/193* (2006.01)
*H04N 1/00* (2006.01)
*H04N 1/62* (2006.01)

(52) U.S. Cl.
CPC ........... *H04N 1/125* (2013.01); *H04N 1/1235* (2013.01); *H04N 1/193* (2013.01); *H04N 1/62* (2013.01); *H04N 2201/0081* (2013.01); *H04N 2201/044* (2013.01)

(56) References Cited

U.S. PATENT DOCUMENTS

| | | | | |
|---|---|---|---|---|
| 2003/0090742 | A1* | 5/2003 | Fukuda | H04N 1/04 358/448 |
| 2007/0109605 | A1* | 5/2007 | Shimizu | G06T 7/0002 358/3.26 |
| 2011/0043875 | A1 | 2/2011 | Tokuda | |

OTHER PUBLICATIONS

Non-Final Office Action issued in U.S. Appl. No. 13/076,577, dated Nov. 14, 2012.
Notice of Allowance issued in U.S. Appl. No. 13/076,577, dated Apr. 26, 2013.
Non-Final Office Action issued in U.S. Appl. No. 13/076,577, dated Sep. 23, 2013.
Final Office Action issued in U.S. Appl. No. 13/076,577, dated Feb. 27, 2014.
Non-Final Office Action issued in U.S. Appl. No. 13/076,577, dated Aug. 14, 2015.
Final Office Action issued in U.S. Appl. No. 13/076,577, dated Feb. 2, 2015.
Notice of Allowance issued in U.S. Appl. No. 13/076,577, dated Jul. 10, 2015.

* cited by examiner

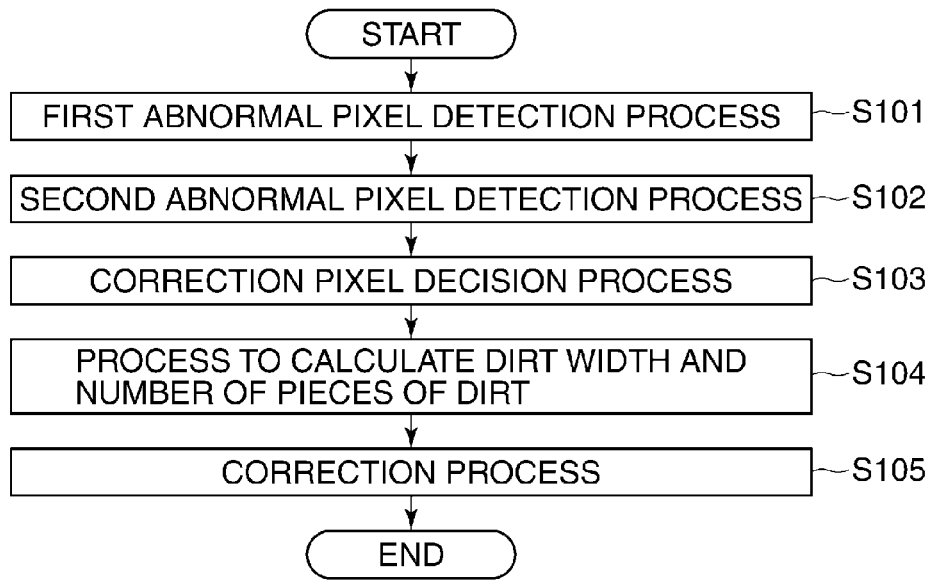
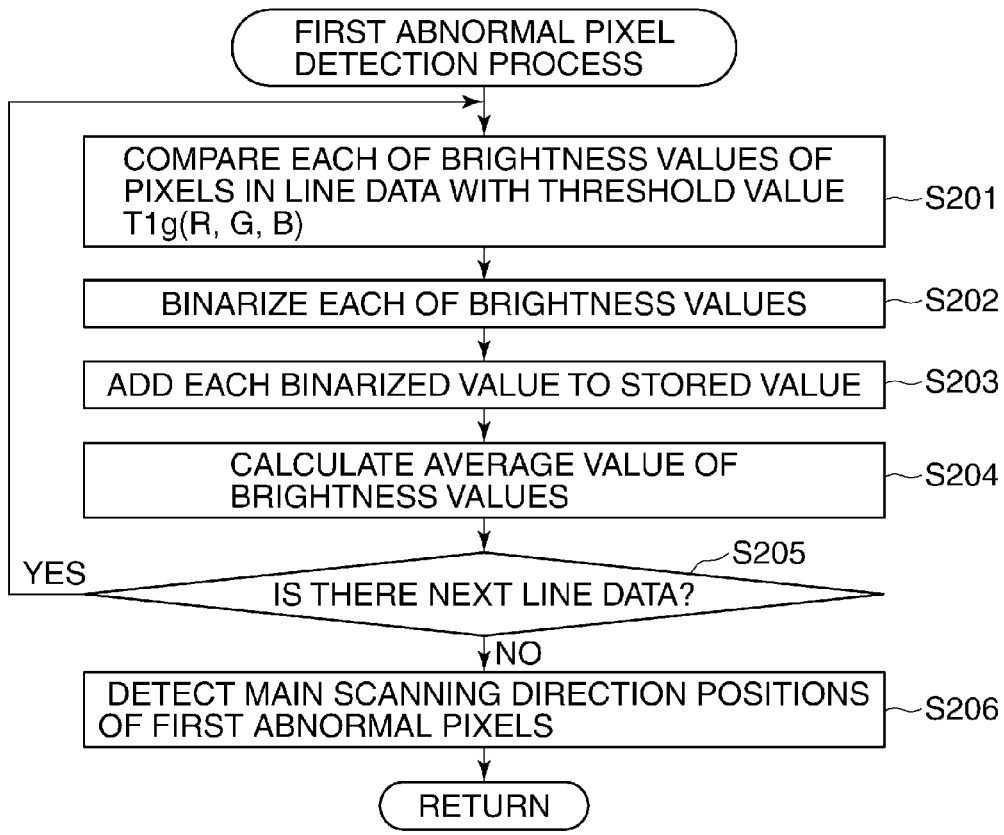

IMAGE READING APPARATUS, INCLUDING ABNORMAL PIXEL DETECTION, AND IMAGE READING METHOD

BACKGROUND OF THE INVENTION

1. Field of the Invention

The present invention relates to an image reading apparatus and an image reading method.

2. Description of the Related Art

Conventionally, an image reading apparatus configured to read an original by so-called moving document reading has been known. In the moving document reading, a reading unit having a light source for irradiating light to an original is stopped at a moving document reading position. When an original conveyed by an automatic original conveyance apparatus (hereinafter, referred to as the ADF) passes through the moving document reading position, the reading unit reads the original by scanning it in a main scanning direction.

The reading unit stopped at the moving document reading position faces a lower surface of a moving document reading glass disposed at the moving document reading position so as to permit light irradiated from the reading unit to pass therethrough, and the original is conveyed by the ADF between an original guide and the moving document reading glass along an upper surface of the moving document reading glass.

In the moving document reading, if there is a contaminant such as dirt (including dust), stain, or flaw on the moving document reading glass, an image streak along a sub-scanning direction appears in an image of the read original due to the contaminant being read.

To obviate this, various methods for detecting a contaminant adhered to the moving document reading glass have been proposed.

For example, in a method described in Japanese Laid-open Patent Publication No. 2005-045462, an original guide is read in a state before an original is conveyed up to the reading position. Then, leading and trailing end portions of an original passing through the reading position are read, and portions of the original passing through the reading position, other than the leading and trailing end portions thereof, are also read. If pixels of plural consecutive reading lines which are the same in density are present at the same main scanning direction position in respective main scanning direction line data obtained by the readings, these pixels are detected as abnormal pixels. With this method, only dirt adhered to the moving document reading glass can be detected as abnormal pixels and can be corrected. Since the dirt detection is performed each time one original is read, dirt conveyed together with an original up to the moving document reading glass can also be detected.

However, in a case that abnormal pixels are detected by the method disclosed in Japanese Laid-open Patent Publication No. 2005-045462 based on a result of the reading of the original guide in a state before an original is conveyed up to the reading position and a result of the reading of original end portions, normal pixels are sometimes erroneously detected as abnormal pixels and unnecessary correction is performed, if the density of dirt adhered to the original guide is close to the density of a base surface of the original end portions or close to the density of an image of the original end portions. To correct abnormal pixels, there is a method for replacing abnormal pixels with adjacent pixels, for example. However, since a corrected portion becomes visually noticeable in a case, for example, that an original image is a screen image, it is preferable that unnecessary correction be avoided as much as possible.

SUMMARY OF THE INVENTION

The present invention provides an image reading apparatus and an image reading method capable of detecting, with high accuracy, abnormal pixels caused by a contaminant such as dirt, stain, or flaw on a moving document reading glass being read.

According to a first aspect of this invention, there is provided an image reading apparatus, which comprises an original conveyance unit configured to convey an original so as to be introduced into between a moving document reading glass and a reference member and so as to pass through a moving document reading position, the moving document reading glass and the reference member being disposed to face each other at the moving document reading position, a reading unit having line sensors for respective colors which are disposed to extend in a direction perpendicular to an original conveyance direction, the reading unit being configured to read through the moving document reading glass the original passing through the moving document reading position, the reading unit being configured to perform a first abnormal pixel detection process for detecting pixel signals that represent abnormal pixels and are output from at least one of the line sensors for respective colors when the reference member is read by the reading unit through the moving document reading glass in a state before the original passes through the moving document reading position, and configured to perform a second abnormal pixel detection process for detecting pixel signals that represent abnormal pixels and are output from at least one of the line sensors for respective colors when the original is read by the reading unit through the moving document reading glass in a state that the original is being conveyed, and a detection unit configured to detect, based on results of the first and second abnormal pixel detection processes, a position in an extending direction of the line sensors where pixel signals that represent abnormal pixels are output.

According to a second aspect of this invention, there is provided an image reading apparatus, which comprises an original conveyance unit configured to convey an original so as to be introduced into between a moving document reading glass and a reference member and so as to pass through a moving document reading position, the moving document reading glass and the reference member being disposed to face each other at the moving document reading position, a reading unit configured to read the original in a main scanning direction through the moving document reading glass when the original passes through the moving document reading position, a first abnormal pixel detection unit configured to detect pixels each having a brightness value less than a first abnormal pixel detection threshold value among pixels located at a same main scanning direction position in plural pieces of line data for respective colors obtained by the reading unit by reading the reference member through the moving document reading glass in a state before the original passes through the moving document reading position, the first abnormal pixel detection unit being configured, in a case where a number of detected pixels is equal to or greater than a first abnormal pixel determination threshold value, to detect pixels located at the main scanning direction position as first abnormal pixels, a second abnormal pixel detection unit configured to detect pixels each having a brightness value less than a second abnormal pixel detection threshold value among pixels located at a same main scanning direction position in plural pieces of line data for respective colors obtained by the reading unit by reading a leading end portion of the original through the moving document reading glass in a state that the original is being conveyed, the second abnormal pixel detection unit being configured, in a case where a number of detected pixels is equal to or greater than a second abnormal pixel determination threshold value, to detect pixels located at the main scanning direction position as second abnormal pixels, and a decision unit configured, in a case where the pixels detected as the first abnormal pixels and the pixels detected as the second abnormal pixels are located at a same main scanning direction position, to decide, as abnormal pixels of plural consecutive reading lines, pixels located at the same main scanning direction position among pixels in line data for respective colors obtained by the reading unit by reading through the moving document reading glass the original from its leading end portion to its trailing end portion.

According to a third aspect of this invention, there is provided an image reading method corresponding to the image reading apparatus described in the first aspect.

According to a fourth aspect of this invention, there is provided an image reading method corresponding to the image reading apparatus described in the second aspect.

With this invention, it is possible to detect, with high accuracy, abnormal pixels caused by a contaminant such as dirt, stain, or flaw on a moving document reading glass being read.

Further features of the present invention will become apparent from the following description of an exemplary embodiment with reference to the attached drawings.

BRIEF DESCRIPTION OF THE DRAWINGS

FIG. 4 is a flowchart showing procedures of a process performed by the image processing unit;

FIG. 5 is a flowchart showing procedures of a first abnormal pixel detection process performed in the process shown in FIG. 4;

DESCRIPTION OF THE EMBODIMENTS

The present invention will now be described in detail below with reference to the drawings showing a preferred embodiment thereof.

Figure 1:
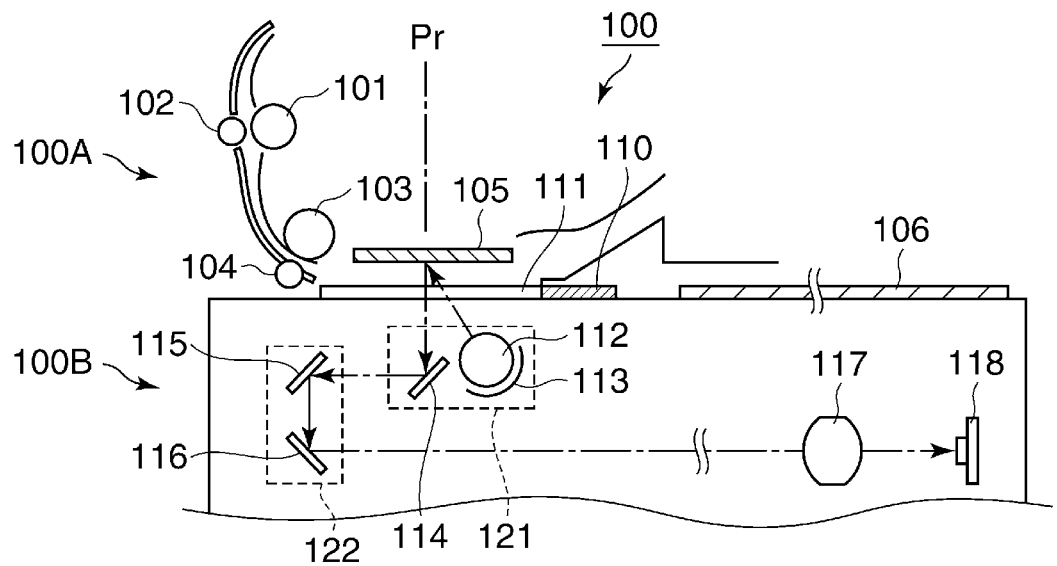
FIG. 1 is a fragmentary vertical section view showing the construction of a main part of an image reading apparatus according to one embodiment of this invention.

FIG. 1 shows in vertical section the construction of a main part of an image reading apparatus according to one embodiment of this invention.

As shown in FIG. 1, the image reading apparatus 100 includes an original conveyance unit 100A for conveying an original and an original reading unit 100B for scanning and reading an original, and is capable of performing stationary reading and moving document reading.

The original conveyance unit 100A includes a registration roller 101 and driven roller 102, and includes a lead roller 103 and driven roller 104. The registration roller 101 and the driven roller 102 align the leading end of an original being conveyed in place and convey the original toward the lead roller 103 and the driven roller 104. The lead roller 103 and the driven roller 104 guide the original into between a moving document reading glass 111 and a guide plate 105, which are disposed at a moving document reading position Pr so as to face each other. The original passes through the moving document reading position Pr and is discharged to a sheet discharge tray (not shown).

The moving document reading glass 111 is formed by a flat plate that permits light to pass therethrough. The guide plate 105 is disposed above the moving document reading glass 111 to face an upper surface of the moving document reading glass 111. The guide plate 105 is formed by a reference member, e.g., a plate-like white colored member whose lower surface (facing the moving document reading glass 111) is uniform in density. The guide plate 105 acts to press an original toward the moving document reading glass 111 when the original passes through the moving document reading position Pr, whereby the original is conveyed along the upper surface of the moving document reading glass 111, so that the reading of the original is stabilized.

On the side downstream of the moving document reading glass 111, an original table glass 106 is disposed, and a white colored plate 110 is disposed between the moving document reading glass 111 and the original table glass 106. The white colored plate 110 is read by the original reading unit 100B, and a reading result is used for shading correction.

The original reading unit 100B includes a first carriage 121 mounted with a light source 112, reflection plate 113, and mirror 114, includes a second carriage 122 mounted with mirrors 115, 116, and includes a lens 117 and image sensor 118. The first and second carriages 121, 122 are configured to be cooperatively movable in the sub-scanning direction. The lens 117 and the image sensor 118 are fixed in their positions.

The image sensor 118 has, e.g., line sensors for respective colors R, G, and B (red, green, and blue) extending in the main scanning direction and disposed apart from one another in the sub-scanning direction at a distance of a predetermined number of pixels, e.g., two pixels. The main scanning direction refers to a direction perpendicular to the original conveyance direction, and the sub-scanning direction refers to a direction perpendicular to the main scanning direction. An optical image formed on an image pickup surface of the image sensor 118 is converted by the line sensors for respective colors into analog signals for respective colors. These analog signals (i.e., output signals from the line sensors for respective colors) are output on a per main scanning line basis at predetermined time intervals.

To perform the stationary reading, an original is placed on the original table glass 106. The first carriage 121 is moved relative to the original table glass 106 in the sub-scanning direction, and the second carriage 122 is moved in the sub-scanning direction interlockingly with the movement of the first carriage 121. At that time, the light source 112 mounted on the first carriage 121 is lit. Light from the light source 112 is collected by the reflection plate 113 and irradiated toward the original table glass 106. As a result, the original placed on the original table glass 106 is scanned in the sub-scanning direction in a state irradiated by the light source 112. The reflection light from the original is formed into an image on the image pickup surface of the image sensor 118 via the moving document reading glass 111, mirrors 114, 115, 116, and lens 117.

To perform the moving document reading, the first carriage 121 is held at the moving document reading position Pr, and the second carriage 122 is held at a position away from the first carriage 121 by a predetermined distance. Light from the light source 112 is collected by the reflection plate 113 and irradiated toward the moving document reading position Pr through the moving document reading glass 111. Before the original reaches the moving document reading position Pr, the irradiated light is reflected by the guide plate 105. When the original passes through the moving document reading position Pr, the irradiated light is reflected by the original. Reflection light is guided to the lens 117 by the moving document reading glass 111 and the mirrors 114-116, and formed by the lens 117 into an image on the image pickup surface of the image sensor 118. When passing through the moving document reading position Pr, the original is read in the main scanning direction by the image sensor 118 through the moving document reading glass 111. The image sensor 118 outputs signals for respective main scanning lines (reading lines) at predetermined time intervals. In a case where the moving document reading glass 111 to which dirt is adhered is read for a predetermined time period, the image sensor 118 continuously outputs image signals for reading lines that correspond to the dirt. Also in a case where the guide plate 105 to which dirt is adhered is read for a predetermined time period, the image sensor 118 continuously outputs image signals for reading lines that correspond to the dirt.

To perform the moving document reading, the lower surface of the guide plate 105 (facing the moving document reading glass 111) is read by the original reading unit 100B through the moving document reading glass 111 at a timing before an original is conveyed up to the guide plate 105 (or a timing between timings where originals being conveyed are read), as described later. A result of the reading of the guide plate 105 is used for detection of abnormal pixels caused by a contaminant such as dirt, stain, or flaw on the lower surface of the guide plate 105 being read or a contaminant on the upper or lower surface of the moving document reading glass 111 being read (i.e., used for a first abnormal pixel detection process).

Figure 2:
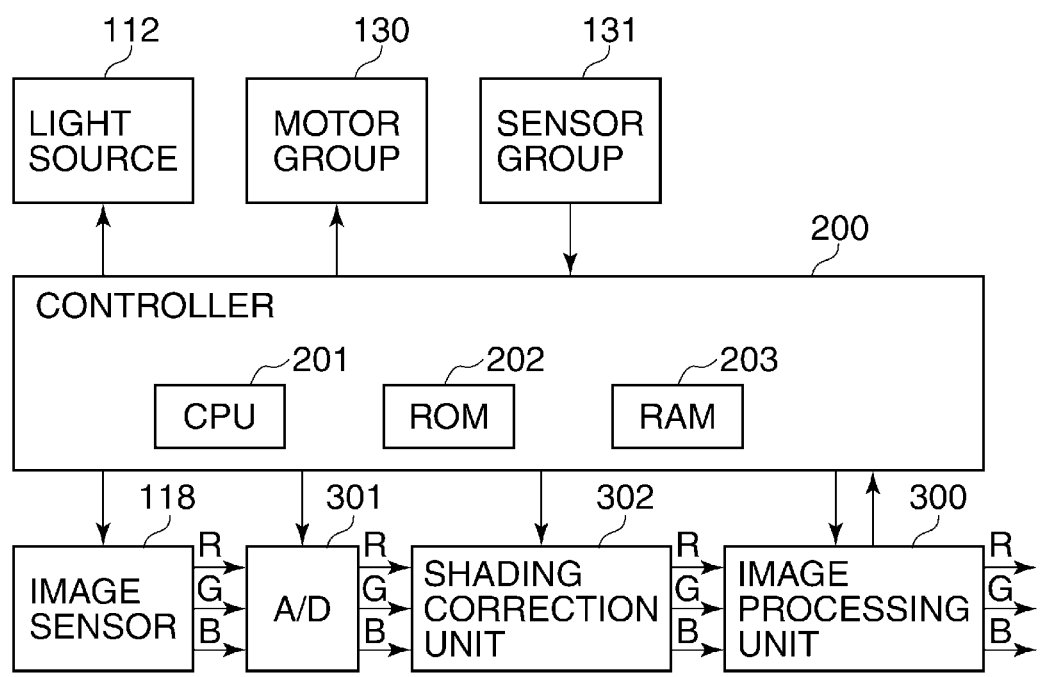
FIG. 2 is a block diagram showing a control structure of the image reading apparatus.

Next, a control structure of the image reading apparatus 100 will be described. FIG. 2 shows in block diagram a control structure of the image reading apparatus 100.

As shown in FIG. 2, the image reading apparatus 100 includes a controller 200 that includes a CPU 201, ROM 202, and RAM 203. The CPU 201 controls the entire apparatus and performs various processing according to a program stored in the ROM 202. The RAM 203 provides a work area for the CPU 201 and a storage area for temporarily storing data.

The controller 200 (CPU 201) outputs control signals for controlling lighting of the light source 112 and for controlling drive of the image sensor 118. Based on outputs of a sensor group 131, the controller 200 outputs control signals for individually controlling the drive of motors (not shown) of a motor group 130.

The motor group 130 includes conveyance motors (not shown) for rotatably driving a group of rollers including the registration roller 101 and lead roller 103 of the original conveyance unit 100A, and includes carriage motors (not shown) for moving the first and second carriages 121, 122 of the original reading unit 100B in the sub-scanning direction.

The sensor group 131 includes an original sensor (not shown) for detecting an original being conveyed and home position sensors (not shown) for detecting that the first and second carriages 121, 122 are at home positions.

The controller 200 outputs control signals for controlling the drive of the conveyance motors based on, e.g., the output of the original sensor, and outputs control signals for controlling the drive of the carriage motors based on the outputs of the home position sensors.

The controller 200 generates and outputs timing signals for controlling operations of an image processing unit 300, A/D converter 301, and shading correction unit 302.

The A/D converter 301 converts analog signals for respective colors (R, G, B) output from the image sensor 118 into digital signals. The digital signals for respective colors are input, as line data for respective colors, into the shading correction unit 302.

The shading correction unit 302 performs shading correction on the input line data for respective colors based on a shading correction value calculated from a result of the reading of the white colored plate 110. The line data for respective colors after the shading correction are input into the image processing unit 300. Since the shading correction is known, a description thereof is omitted.

The image processing unit 300 performs processing to detect abnormal pixels of plural consecutive reading lines that are present at the same main scanning direction position in the line data for respective colors input from the shading correction unit 302 and to correct the detected abnormal pixels (i.e., correction object pixels). These abnormal pixels are caused by a contaminant such as dirt, stain, flaw on the moving document reading glass 111 (hereinafter, referred to as the dirt) being read.

Figure 3:
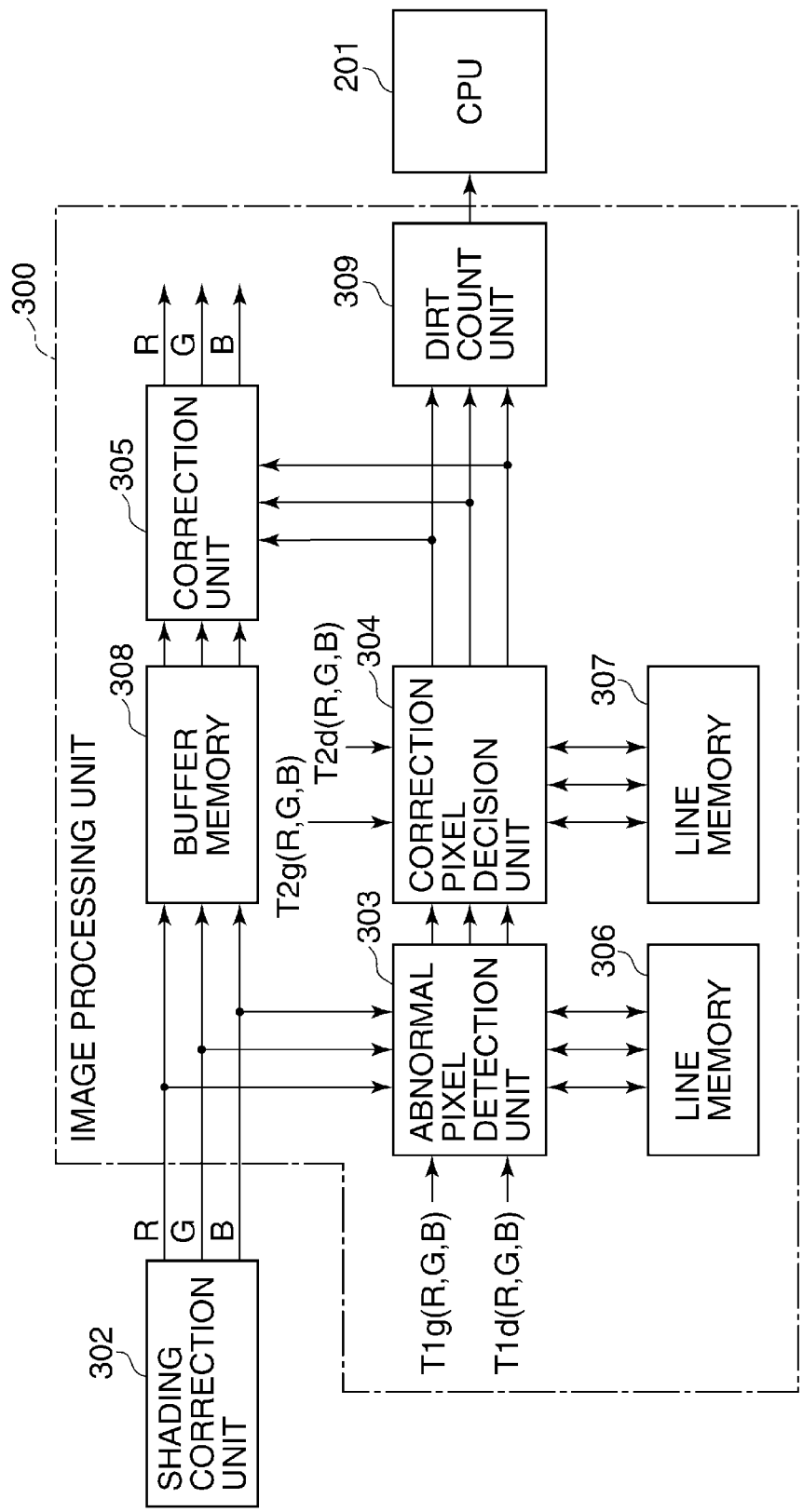
FIG. 3 is a block diagram showing the construction of an image processing unit of the image reading apparatus.

Next, a description will be given of the construction of the image processing unit 300 and a process performed by the unit 300. FIG. 3 shows in block diagram the construction of the image processing unit 300, and FIG. 4 shows in flowchart the procedures of a process performed by the image processing unit 300.

In the moving document reading, if dirt is adhered to the moving document reading glass 111, an image streak along the sub-scanning direction appears in the read original image due to the dirt being read. Thus, in this embodiment, a main scanning direction position of abnormal pixels caused by dirt on the moving document reading glass 111 being read (i.e., a main scanning direction position (or a position in the direction in which the line sensors extend) where pixel signals representing abnormal pixels are output) is detected as described below. It is assumed that dirt has a size not greater than 5 pixels (with pixel size of, e.g., 42.3 μm), which only produces acceptable deterioration in image quality caused by correction to the abnormal pixels.

In this embodiment, when detecting abnormal pixels, a first abnormal pixel detection process is performed on plural pieces of line data for respective colors obtained by reading the guide plate 105 by the original reading unit 100B through the moving document reading glass 111 in a state before an original passes through the moving document reading position Pr, and a second abnormal pixel detection process is performed on plural pieces of line data for respective colors obtained by reading a leading end portion of an original by the original reading unit 100B through the moving document reading glass 111 in a state where the original is being conveyed. Based on results of the first and second abnormal pixel detection processes, abnormal pixels of plural consecutive reading lines are detected, which are present at the same main scanning direction position in line data for respective colors obtained by reading the original from its leading end portion to its trailing end portion. The details of the abnormal pixel detection will be described later.

As shown in FIG. 3, the image processing unit 300 includes, as a structure for abnormal pixel detection, an abnormal pixel detection unit 303, correction pixel decision unit 304, correction unit 305, two line memories 306, 307, buffer memory 308, and dirt count unit 309.

In the moving document reading, the reading of the guide plate 105 by the original reading unit 100B is started. The reading of the guide plate 105 is repeated in a state where the first carriage 121 is not moved in the sub-scanning direction but held at the moving document reading position Pr. More specifically, a predetermined position (corresponding to the moving document reading position Pr) of the lower surface of the guide plate 105 is repeatedly read through the moving document reading glass 111. Then, plural pieces of line data for respective colors obtained by reading the guide plate 105 are shading corrected by the shading correction unit 302 and sequentially input to the image processing unit 300.

Referring to FIG. 4, the abnormal pixel detection unit 303 of the image processing unit 300 performs the first abnormal pixel detection process on the plural pieces of line data for respective colors obtained by reading the guide plate 105 (step S101). In the reading of the guide plate 105, a plural number X of lines (e.g., 100 lines) along the main scanning direction are read, thereby obtaining the plural number X of line data for respective colors.

In the first abnormal pixel detection process, brightness values of pixels at each main scanning direction position in the plural pieces of line data for respective colors obtained by reading the guide plate 105 are each compared with a predetermined first abnormal pixel detection threshold value T1g(R, G, B), and pixels each having a brightness value less than the threshold value T1g(R, G, B) are detected as abnormal pixels (pixel signals representing abnormal pixels), and the number of the detected abnormal pixels is counted.

Next, the counted number of the abnormal pixels is compared with a predetermined first abnormal pixel determination threshold value T2g(R, G, B). If the number of the counted abnormal pixels is equal to or larger than the threshold value T2g(R, G, B), the main scanning direction position of these abnormal pixels (i.e., the main scanning direction position of line data for the color corresponding to the abnormal pixels) is detected as the main scanning direction position of first abnormal pixels (i.e., the main scanning direction position of line data for the color corresponding to the first abnormal pixels). The first abnormal pixels refer to abnormal pixels caused by dirt adhered to the guide plate 105 being read and/or dirt adhered to the moving document reading glass 111 being read.

The result of detection in the first abnormal pixel detection process is stored into a corresponding address region of the line memory 306. The line memory 306 has address regions which are made in advance corresponding to main scanning direction positions of line data for respective colors. The result of detection in the first abnormal pixel detection process stored in the line memory 306 is transferred via the correction pixel decision unit 304 to the line memory 307 when a second abnormal pixel detection process (described later) is started, and cleared from the line memory 306 after being transferred. The line memory 307 has memory addresses made in advance corresponding to main scanning direction positions of line data for respective colors.

Next, an average value of brightness values of the first abnormal pixels (hereinafter, referred to as the average brightness value) is calculated and stored into the line memory 306 so as to correspond to the main scanning direction position of the first abnormal pixels.

After completion of the first abnormal pixel detection process, the reading of an original is started, and plural pieces of line data for respective colors obtained by reading a leading end portion of the original are sequentially input to the image processing unit 300. In this embodiment, plural pieces (e.g., Y pieces) of line data for respective colors (R, G, B) obtained by reading plural lines (e.g., Y lines) starting from the leading end of the original are used for the second abnormal pixel detection process.

The abnormal pixel detection unit 303 performs the second abnormal pixel detection process on the plural pieces of line data for respective colors obtained by reading the leading end portion of the original (step S102).

In the second abnormal pixel detection process, brightness values of pixels at each main scanning direction position in the plural pieces of line data for respective colors obtained by reading the leading end portion of the original are each compared with a predetermined second abnormal pixel detection threshold value T1d(R, G, B), and pixels each having a brightness value less than the threshold value T1d(R, G, B) are detected as abnormal pixels. From among the detected abnormal pixels, abnormal pixels for which absolute values of differences between their brightness values and the average brightness value stored in the line memory 306 are each equal to or less than a predetermined value are detected, and the number of these abnormal pixels is counted.

Next, the counted number of the abnormal pixels is compared with a second abnormal pixel determination threshold value T2d(R, G, B). If the counted number of abnormal pixels is not less than the threshold value T2d(R, G, B), the main scanning direction position of these abnormal pixels (i.e., the main scanning direction position of line data for the color corresponding to these abnormal pixels) is detected as the main scanning direction position of second abnormal pixels (i.e., the main scanning direction position of line data for the color corresponding to the second abnormal pixels). The second abnormal pixels refer to abnormal pixels of plural consecutive plural reading lines, which are caused by dirt adhered to the moving document reading glass 111 being read. The result of detection in the second abnormal pixel detection process is stored into the line memory 306.

Next, the correction pixel decision unit 304 performs a correction pixel decision process in which abnormal pixels caused by dirt adhered to the moving document reading glass 111 being read are separated as correction object pixels from the first and second abnormal pixels and a main scanning direction position of the correction object pixels is decided (step S103).

In the correction pixel decision process, the result of detection in the second abnormal pixel detection process and the result of detection in the first abnormal pixel detection process (both of the results being associated with line data for the same color) are read from the line memories 306, 307 and compared with each other. If it is determined by the comparison that the main scanning direction position of the second abnormal pixels is the same as the main scanning direction position of the first abnormal pixels (both of the positions being associated with the line data for the same color), the main scanning direction position of the second abnormal pixel is decided as the main scanning direction position of correction object pixels, and correction pixel position information representing the decided main scanning direction position of correction object pixels is stored into the line memory 307.

Next, the dirt count unit 309 performs a calculation process to calculate a dirt width and the number of pieces of dirt in the main scanning direction at the moving document reading position Pr based on the correction pixel position information stored in the line memory 307 (step S104). The calculated dirt width or the calculated number of pieces of dirt is output to the CPU 201. The CPU 201 determines whether the calculated dirt width or the calculated number of pieces of dirt exceeds a predetermined allowable value. If the calculated dirt width or the calculated number of pieces of dirt exceeds the allowable value, the CPU 201 causes the display unit (not shown) to display a message prompting a user to maintain and clean the moving document reading glass 111. Alternatively, it is possible to transmit the message to an external apparatus, e.g., a PC (personal computer), connected to the image reading apparatus 100 and cause the PC to display the message. It is also possible for the CPU 201 to perform control to interrupt a current reading operation when the calculated dirt width or the calculated number of pieces of dirt exceeds the allowable value.

Next, the correction unit 305 performs a correction process to correct the correction object pixels which are at the main scanning direction position represented by the correction pixel position information stored in the line memory 307 (step S105). In the correction process, the correction object pixels among pixels of line data for respective colors output from the buffer memory 308 are corrected. For example, brightness values of the correction object pixels are corrected by means of, e.g., a linear interpolation method using brightness values of pixels adjacent to the correction object pixels on the opposite sides thereof.

As described above, the first and second abnormal pixel detection processes, correction pixel decision process, calculation process, and correction process are performed on a per read original basis.

Figure 6:
FIG. 6 is a view showing, in comparison with an abnormal pixel determination threshold value T2g(R), an example of sum values each representing the number of abnormal pixels in line data for R color at a main scanning direction position obtained in the first abnormal pixel detection process.
Figure 7:
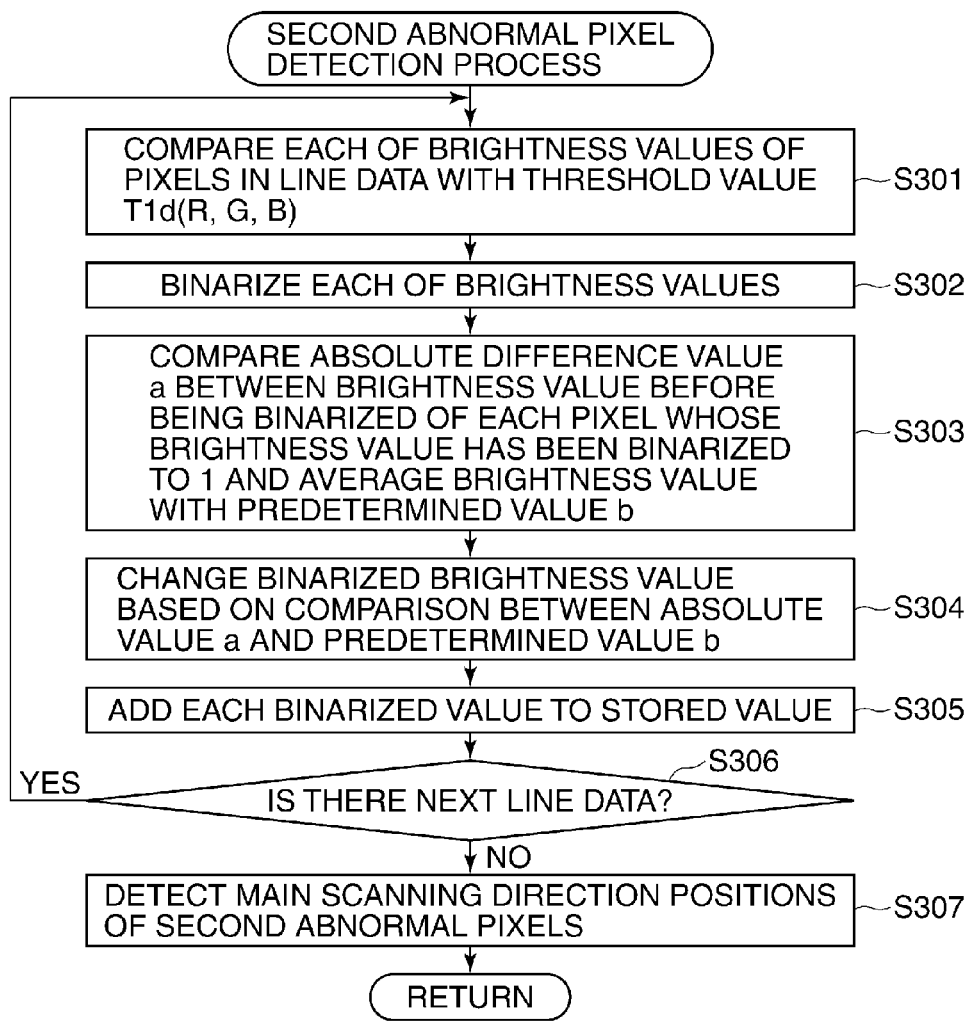
FIG. 7 is a flowchart showing procedures of a second abnormal pixel detection process performed in the process shown in FIG. 4.

Next, the details of the first and second abnormal pixel detection processes performed by the abnormal pixel detection unit 303 will be described. FIG. 5 shows in flowchart the procedures of the first abnormal pixel detection process. FIG. 6 shows, in comparison with the abnormal pixel determination threshold value T2$g$(R), an example of sum values each representing the number of abnormal pixels in line data for R color at a main scanning direction position obtained in the first abnormal pixel detection process. FIG. 7 shows in flowchart the procedures of the second abnormal pixel detection process. Since the same processing is performed on line data for respective colors in the first and second abnormal pixel detection processes, the processing performed on line data for R color will only be described below, with a description of the processing on line data for other colors (G, B) omitted.

In the first abnormal pixel detection process, as shown in FIG. 5, each of reading brightness values of pixels at each of main scanning direction positions in line data for R color obtained by reading the guide plate 105 is compared with the abnormal pixel detection threshold value T1$g$(R) (step S201). In this embodiment, the reading brightness values are each represented in 256 gradations (8 bits). In other words, the brightness values of pixels for R, G, B colors each have a gradation value from 0 to 255.

Next, each of the brightness values of pixels at the main scanning direction position in the line data for R color is binarized based on a result of the comparison (step S202). Specifically, a pixel brightness value less than the abnormal pixel detection threshold value T1$g$(R) is binarized to 1, whereas a pixel brightness value equal to or greater than the threshold value T1$g$(R) is binarized to 0.

Next, the binarized value (1 or 0) of each pixel of the line data for R color at each main scanning direction position is added to a value stored in a corresponding address region of the line memory 306 (step S203). The resultant sum value is overwritten/stored in the address region.

Next, an average value of brightness values (before being binarized) of pixels each having the binarized brightness value of 1 (hereinafter, referred to as the average brightness value) is calculated (step S204). The average brightness value is stored into a corresponding address region of the line memory 306.

Next, it is determined whether there is the next line data (step S205). If there is the next line data, the process returns to step S201. Thus, the processing in steps S201 to S204 is performed on all the plural pieces (X pieces) of line data for R color obtained by reading the guide plate 105. Each of sum values stored in address regions of the line memory 306 represents the number of abnormal pixels in the line data for R color at the main scanning direction position corresponding to the address region, each abnormal pixel having a brightness value less than the abnormal pixel detection threshold value T1$g$(R).

Next, one or more main scanning direction positions of first abnormal pixels are detected (step S206). Specifically, each of the sum values stored in the line memory 306 is compared with the abnormal pixel determination threshold value T2$g$(R), and each sum value is binarized based on a result of the comparison. The determination threshold value T2$g$(R) is set in advance according to the number X of lines in a reading range of the guide plate 105. In a case, for example, that the number X of lines is 100, the determination threshold value T2$g$(R) is set to a value of 75.

In an example shown in FIG. 6, a sum value 601 representing the number of abnormal pixels in line data for R color at a main scanning direction position x1 is greater than the determination threshold value T2$g$(R). This indicates that the number of abnormal pixels, each having a brightness value less than the abnormal pixel detection threshold value T1$g$(R), in the line data for R color at the main scanning direction position x1 is equal to or greater than the determination threshold value T2$g$(R). It is therefore detected that there are first abnormal pixels in the line data for R color at the main scanning direction position x1, and the sum value 601 of the brightness values is binarized to 1.

On the other hand, a sum value 602 of brightness values of pixels in line data for R color at a main scanning direction position x2 is less than the determination threshold value T2g(R), and therefore it is detected that there are no first abnormal pixels in the line data for R color at the main scanning direction position x2, and the sum value 602 of the brightness values is binarized to 0.

The binarized sum values (1 or 0) are each stored from the correction pixel decision unit 304 to a corresponding address region of the line memory 307. In other words, each of addresses of address regions of the line memory 307, in which sum values of 1 are stored, provides information that represents a main scanning direction position of first abnormal pixels in the line data for R color.

Upon completion of the first abnormal pixel detection process, the second abnormal pixel detection process is started. At the start of the second abnormal pixel detection process, the sum values of brightness values stored in the line memory 306 are cleared, but the average brightness values are held in the line memory 306 without being cleared.

In the second abnormal pixel detection process, as shown in FIG. 7, brightness values of pixels at each main scanning direction position in plural pieces of line data for R color obtained by reading a leading end portion of an original are each compared with the abnormal pixel detection threshold value T1d(R) (step S301).

Next, based on results of the comparison, the brightness value of each pixel at each main scanning direction position is binarized (step S302). Specifically, the brightness value less than the abnormal pixel detection threshold value T1d(R) is binarized to 1, whereas the brightness value equal to or greater than the threshold value T1d(R) is binarized to 0. The abnormal pixel detection threshold value T1d(R) differs from the abnormal pixel detection threshold value T1g(R), and is set to a value that satisfies formula (1), preferably formulae (2) to (4), which will be described later.

Next, an absolute difference value a between the brightness value before being binarized of each pixel whose brightness value has been binarized to 1 and an average brightness value stored in the corresponding address region of the line memory 306 is compared with a predetermined value b (step S303). Based on the comparison between the absolute value a and the predetermined value b, the binarized brightness value is changed, where required (step S304). Specifically, pixels whose the absolute difference value a is equal to or less than the predetermined value b are determined as being candidates for correction object pixels, and the binarized brightness values of these pixels are each retained at 1. On the other hand, pixels whose absolute difference value a is greater than the predetermined value b are determined as not being candidates for correction object pixels, and the binarized brightness values thereof are each changed from 1 to 0.

Next, the binarized brightness value (1 or 0) of each pixel is added to a value stored in the corresponding address region of the line memory 306, and the resultant sum value is overwritten/stored in the address region (step S305).

Next, it is determined whether there is the next line data (step S306). If there is the next line data, the process returns to step S301. Thus, the processing in steps S301 to S305 is performed on all the plural pieces (Y pieces) of line data for R color obtained by reading the leading end portion of the original. Each of sum values stored in address regions of the line memory 306 represents the number of abnormal pixels in the line data for R color at the main scanning direction position corresponding to the address region, each abnormal pixel having a brightness value less than the abnormal pixel detection threshold value T1d(R).

Next, one or more main scanning direction positions of second abnormal pixels are detected (step S307). Specifically, each of the sum values stored in the line memory 306 is compared with an abnormal pixel determination threshold value T2d(R), and each sum value is binarized based on a result of the comparison. The determination threshold value T2d(R) is set in advance according to the number Y of lines in an original reading range. In a case, for example, that the number Y of lines is 100, the determination threshold value T2d(R) is set to a value of 75.

In a case where the sum value representing the number of abnormal pixels is equal to or greater than the determination threshold value T2d(R), it is determined that there are second abnormal pixels in the line data for R color at the main scanning direction position corresponding to the sum value, and the sum value is binarized to 1. On the other hand, if the sum value is less than the determination threshold value T2d(R), it is determined that there are no second abnormal pixels in the line data for R color at the main scanning direction position corresponding to the sum value, and the sum value is binarized to 0. The binarized sum value (1 or 0) for each main scanning direction position is stored from the correction pixel decision unit 304 to a corresponding address region of the line memory 306. In other words, each of addresses of address regions of the line memory 307 in which sum values of 1 are stored provides information that represents the main scanning direction position of the second abnormal pixels in line data for R color.

After the main scanning direction positions of the first and second abnormal pixels are detected by the first and second abnormal pixel detection processes as described above, a correction pixel decision process is performed by the correction pixel decision unit 304.

Figure 8:
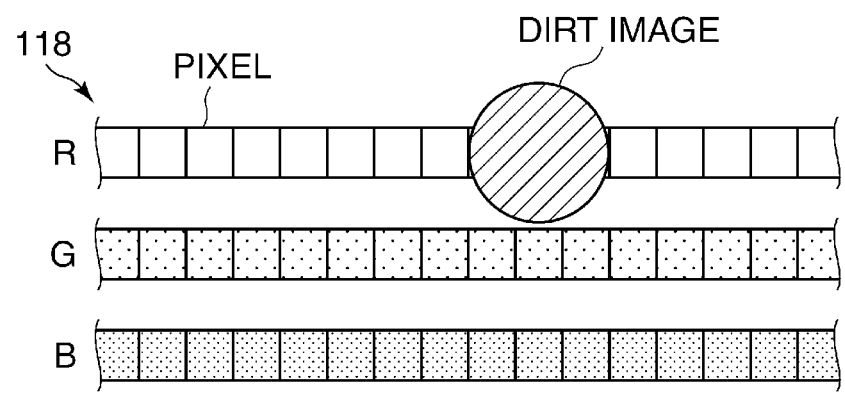
FIG. 8 is a plan view schematically showing a relation between line sensors for R, G, B colors of an image sensor of the image reading apparatus and dirt adhered to a moving document reading glass.
Figure 9:
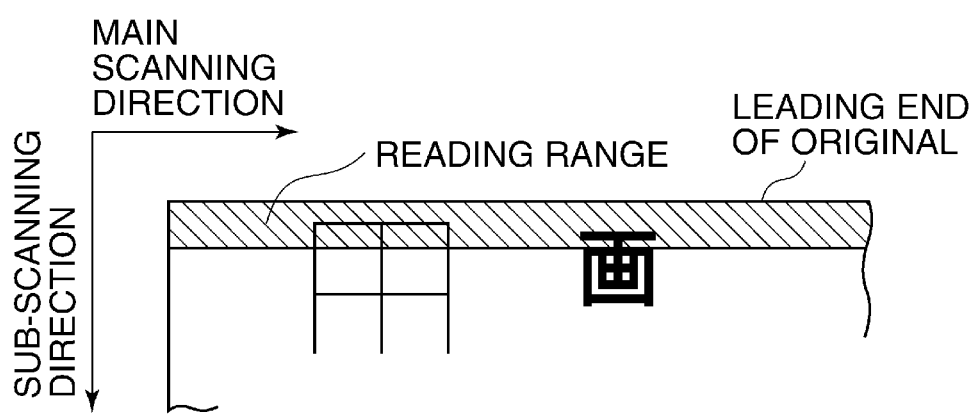
FIG. 9 is a view showing an example of an original formed at its leading end portion with an image.
Figure 10A:
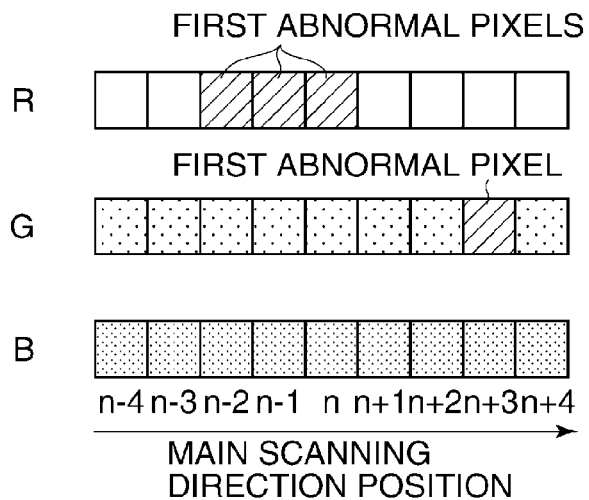
FIG. 10A is a view showing an example of a result of first abnormal pixel detection based on a reading result of a guide plate of the image reading apparatus.
Figure 10B:
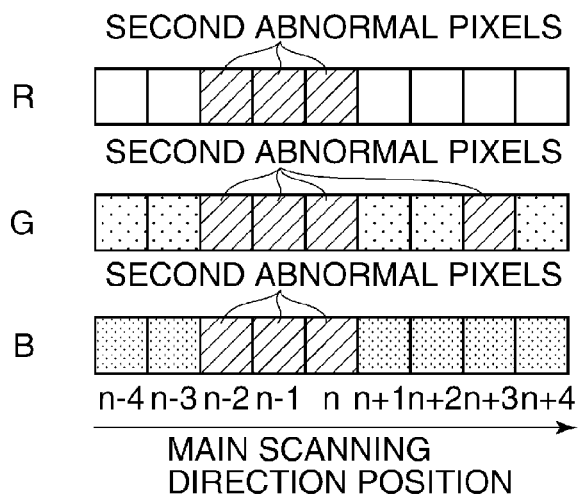
FIG. 10B is a view showing an example of a result of second abnormal pixel detection based on a reading result of a leading end portion of an original.
Figure 10C:
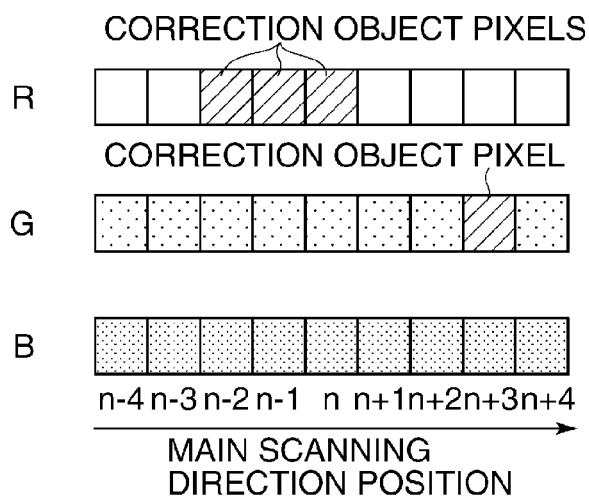
FIG. 10C is a view showing correction object pixels obtained based on the results of first and second abnormal pixel detections shown in FIGS. 10A and 10B.

Next, the details of the correction pixel decision process will be described. FIG. 8 schematically shows in plan view a relation between the line sensors for R, G, B colors of the image sensor 118 and dirt of a size equivalent to 3 to 4 pixels which is adhered to the moving document reading glass 111. FIG. 9 shows an example of an original formed at its leading end portion with an image such as letter, pattern, or ruled line extending in the sub-scanning direction. FIG. 10A shows an example of a result of first abnormal pixel detection based on a reading result of the guide plate 105, FIG. 10B shows an example of a result of second abnormal pixel detection based on a reading result of a leading end portion of an original, and FIG. 10C shows correction object pixels obtained based on the results of first and second abnormal pixel detections shown in FIGS. 10A and 10B.

In the correction pixel decision process, detection results respectively obtained by the first and second abnormal pixel detection processes performed on line data at each main scanning direction position are multiplied together. The detection results obtained by the first and second abnormal pixel detection processes have respectively been stored in the line memories 307, 306. The multiplied value for each main scanning direction position is stored into a corresponding address region of the line memory 307.

The multiplication is performed to select, from the second abnormal pixels, abnormal pixels which are caused by dirt on the moving document reading glass 111 being read and which are to be handled as correction object pixels. If a multiplied value of 1 is obtained by the multiplication, the second abnormal pixels located at the main scanning direction position corresponding to the multiplied value of 1 are present in line data of the same color as that for those pixels detected as the first abnormal pixels and are located at the same main scanning direction position as that where the pixels detected as the first abnormal pixels are located. Such second abnormal pixels are abnormal pixels caused by dirt on the moving document reading glass 111 being read and are to be handled as correction object pixels.

On the other hand, if a multiplied value of 0 is obtained, the second abnormal pixels located at the main scanning direction position corresponding to the multiplied value of 0 are pixels which are erroneously read as abnormal pixels and which are caused by a letter, a pattern, or a ruled line extending in the sub-scanning direction being read, which is located at a leading end of an original. In other words, the second abnormal pixels located at the main scanning direction position corresponding to the multiplied value of 0 are not to be handled as correction object pixels.

The addresses of address regions of the line memory 307 in which multiplied values of 1 are stored represent the main scanning direction positions of correction object pixels in line data for respective colors. In other words, the main scanning direction positions of the correction object pixels in the line data for respective colors can be decided based on the addresses of address regions of the line memory 307 in which the multiplied values of 1 are stored.

In the image sensor 118, as shown for example in FIG. 8, the line sensors for R, G, B colors are disposed with a pitch, e.g., of two line width. It is assumed here that dirt on the moving document reading glass 111 has a size (lengths in the main scanning direction and in the sub-scanning direction) corresponding to 3 to 4 pixels, and an optical image of the dirt is formed on the line sensor for R color.

In that case, the dirt is read only by the line sensor for R color, and is not read by the line sensors for G and B colors. Abnormal pixels caused by the dirt being read appear only in the line data for R color and do not appear in the line data for G and B colors. In other words, the brightness values of the abnormal pixels in the line data for R color become lower, whereas the brightness values of pixels in the line data for G and B colors located at the same position as that of the abnormal pixels become higher.

In a case where an original is formed at its leading end portion with an image such as a letter, a pattern, or a ruled line extending in the sub-scanning direction as shown in FIG. 9, pixels caused by the image being read are sometimes erroneously detected as abnormal pixels.

In this embodiment, to reduce the rate of erroneous abnormal pixel detection, the correction pixel decision unit 304 multiplies, as previously described, corresponding ones of detection results, which are obtained in the first and second abnormal pixel detection processes, to thereby select only abnormal pixels caused in the line data for respective colors by dirt on the moving document reading glass 111 being read. Specifically, if the first and second abnormal pixels detected for line data for the same color are located at the same main scanning direction position, the main scanning direction position is detected as a main scanning direction position of correction object pixels in the line data for that color.

It is assumed that a detection result based on a reading result of the guide plate 104 indicates that as shown for example in FIG. 10A, there are abnormal pixels (each of which is shown by a hatched square in FIG. 10A) at positions of n−2 to n in the line data for R color and at a position of n+3 in the line data for G color, but there are no abnormal pixels in the line data for B color.

It is also assumed that a detection result based on a reading result of an original indicates that as shown in FIG. 10B, there are abnormal pixels (each of which is shown by a hatched square) at positions of n−2 to n in the line data for R color, at positions of n−2 to n and n+3 in the line data for G color, and at positions of n−2 to n in the line data for B color.

The detection result of abnormal pixels shown in FIG. 10A based on the reading result of the guide plate 105 is compared with the detection result of abnormal pixels shown in FIG. 10B based on the reading result of the leading end portion of the original, thereby performing the above-described multiplication of corresponding ones of detection results. As shown in FIG. 10C, among the abnormal pixels specified by the respective detection results, abnormal pixels located at the same position in the same line data are finally decided as correction object pixels. In the example shown in FIG. 10C, pixels located at the positions of n−2 to n in the line data for R color and at the position of n+3 in the line data for G color are decided as the correction object pixels (each of which is shown by a hatched square).

Figure 11:
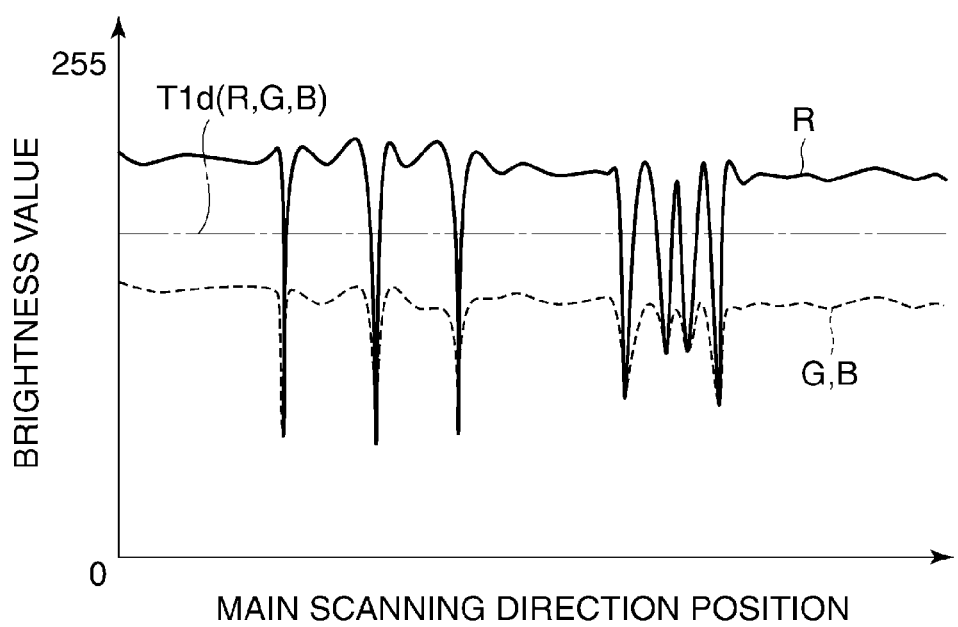
FIG. 11 is a view showing brightness values of pixels in line data for respective colors obtained by reading a leading end portion of an original having a base surface thereof colored by red color.

Next, the abnormal pixel detection threshold values T1$g$(R, G, B) and T1$d$(R, G, B) will be described. FIG. 11 shows brightness values of pixels in line data for respective colors obtained by reading a leading end portion of an original having a red-colored base surface.

The abnormal pixel detection threshold values T1$g$(R, G, B) and T1$d$(R, G, B) are decided by taking account of a difference in illuminance of the moving document reading glass 111 between when the guide plate 105 is read and when an original is read and the color in which a base surface of the original is colored.

When the guide plate 105 is read, dirt adhered to the moving document reading glass 111 is irradiated by light from the light source 112 and by reflection light from the guide plate 105, and therefore, the reading brightness of pixels corresponding to the dirt and read by the image sensor 118 becomes relatively high.

On the other hand, when an original passing through the moving document reading position Pr is read, the dirt adhered to the moving document reading glass 111 is irradiated by light from the light source 112 and by light passing through the original, reflected by the guide plate 105, and again passing through the original. Thus, the reading brightness of pixels corresponding to the dirt and read by the image sensor 118 becomes lower by a gradation value of about 20 to 30 than the reading brightness in the case of reading the guide plate 105.

It is assumed, for example, that the reading result of the guide plate 105 includes pixels corresponding to the dirt on the moving document reading glass 111 and these pixels each have a brightness (gradation) value of 205. In that case, the pixels each having a brightness (gradation) value of 205 are not detected, as first abnormal pixels caused by dirt being read, in the first abnormal pixel detection process, if the abnormal pixel detection threshold value T1$g$(R, G, B) is set to a gradation value of 200.

Although a reading result of the leading end portion of original also includes pixels corresponding to the dirt on the moving document reading glass 111, the brightness (gradation) value of these pixels becomes lower than 200 for the reason mentioned above. It is assumed here that the abnormal pixel detection threshold value T1$d$(R, G, B) for the reading result of the leading end portion of original and the abnormal pixel detection threshold value T1$g$(R, G, B) for the guide plate 105 have the same gradation value (e.g., 200). In that case, pixels corresponding to the dirt and each having a brightness value less than 200 are detected, as second abnormal pixels caused by the dirt being read, in the second abnormal pixel detection process.

If abnormal pixels are detected from reading results in some cases but not in other cases, abnormal pixels caused by the dirt on the moving document reading glass 111 being read are not detected and not corrected in some cases. As a result, an image streak caused by the dirt on the moving document reading glass 111 being read appears in an image of a read original.

To enhance the accuracy of detection of abnormal pixels caused by dirt on the moving document reading glass 111 being read (i.e., the accuracy of detection of dirt), it is preferable that the abnormal pixel detection threshold values T1g(R, G, B) and T1d(R, G, B) be set to different values from each other. For example, the detection threshold values T1g(R, G, B) and T1d(R, G, B) are decided so as to satisfy the following formula (1).

$$T1d(R,G,B)=T1g(R,G,B)-A \quad (1)$$

In formula (1), symbol A represents an integer value, which is set to a gradation value of, e.g., 20 to 30.

Some original has its base surface colored by a chromatic color (other than an achromatic color such as black or gray). In that case, pixels obtained by reading the base surface color of the original are low in brightness, and there is a possibility that these pixels are erroneously detected as abnormal pixels, if the abnormal pixel detection threshold values T1g(R, G, B) and T1d(R, G, B) are set to the same value as each other.

In a case, for example, that a leading end portion of an original having a base surface thereof colored by red color is read, pixels of line data for respective colors have brightness values such as those shown by way of example in FIG. 11. In the illustrated example, the brightness values of pixels in the line data for G and B colors other than the line data for R color become low. If the abnormal pixel detection threshold value T1d(R, G, B) is set to the same value for the line data for respective colors, all the pixels in the line data for G and B colors are sometimes erroneously detected as abnormal pixels.

To obviate this, it is preferable that the abnormal pixel detection threshold value T1d(R, G, B) be corrected to satisfy relations represented by the following formulae (2) to (4).

$$T1d(R)=T1d(R)-\alpha \quad (2)$$

$$T1d(G)=T1d(G)-\beta \quad (3)$$

$$T1d(B)=T1d(B)-\gamma \quad (4)$$

In formulae (2) to (4), symbols $\alpha$, $\beta$, $\gamma$ denote correction values. The correction values $\alpha$, $\beta$, $\gamma$ are integer values and calculated based on an average value of brightness values of pixels obtained when a leading end portion of an original is read. It is assumed, for example, that in a reading result of the leading end portion of the original such as that shown in FIG. 8, an average brightness (gradation) value for pixels in line data for R color is 210, an average brightness value for pixels in line data for G color is 187, and an average brightness value for pixels in line data for B color is 189. In that case, the correction values $\alpha$, $\beta$, $\gamma$ are decided in reference to the highest average brightness value for R color among the average brightness values. For example, the correction values $\alpha$, $\beta$, $\gamma$ are decided to be equal to 0, 23, and 21, respectively. In practice, it is preferable to decide the correction values $\alpha$, $\beta$, $\gamma$ by taking account of formula (1).

By correcting the abnormal pixel detection threshold value T1d(R, G, B) by using the correction values $\alpha$, $\beta$, $\gamma$ as described above, second abnormal pixels can be detected with high accuracy. As a result, abnormal pixels, i.e., correction object pixels, caused by dirt on the moving document reading glass 111 being read can be detected with high accuracy. However, in the case of correcting the abnormal pixel detection threshold value T1d(R, G, B) by using the correction values $\alpha$, $\beta$, $\gamma$, it is necessary to again read an original from its leading end after the leading end portion of the original is read to obtain the correction values $\alpha$, $\beta$, $\gamma$.

In this embodiment, the image processing unit 300 is provided to detect, from first and second abnormal pixels, abnormal pixels caused by dirt on the moving document reading glass 111 being read. Alternatively, the image processing unit 300 can be configured by software. In that case, a program for achieving the functions of the abnormal pixel detection unit 303, correction pixel decision unit 304, correction unit 305, and dirt count unit 309 (flowcharts shown in FIGS. 4, 5, and 7) is stored in the ROM 202 and executed by the CPU 201.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-086066, filed Apr. 2, 2010, which is hereby incorporated by reference herein in its entirety.

What is claimed is:

1. An image reading apparatus comprising:
an original conveyance unit configured to convey an original to a reading position;
a reading unit configured to read the conveyed original at the reading position through a limpidity member, and output the read data;
a reference member disposed so as to face the limpidity member;
a controller connected to a memory, the controller and memory configured to perform:
a first abnormal pixel detection which detects a first position of an first abnormal pixel in a main scanning direction based on a first data acquired by said reading unit reading the reference member through the limpidity member, the main scanning direction being perpendicular to a direction in which the original is conveyed;
a second abnormal pixel detection which detects a second position of a second abnormal pixel in the main scanning direction based on a second data acquired by said reading unit reading a predetermined area of the original through the limpidity member, an absolute value of a difference between the second data of the second abnormal pixel, and the first data corresponding to the second position of the second abnormal pixel in the main scanning direction being less than a predetermined value; and a decision which decides a position detected both as the first position and as the second position, as an abnormal position in the main scanning direction, wherein the first data is acquired by said reading unit before the original corresponding to the second data passes through the reading position.

2. The image reading apparatus according to claim 1, wherein said second abnormal pixel detection unit detects the second abnormal pixel based on a comparison result of the second data with a first threshold value, and based on a comparison result of the difference with the predetermined value, the difference being between second data and an average value of first data corresponding to the second position of the second abnormal pixel in the main scanning direction.

3. The image reading apparatus according to claim 1, the controller and memory further configured to correct the output data of the original at the abnormal position.

4. The image reading apparatus according to claim 1, wherein the predetermined area of the original is a leading end portion of the original.

5. An image reading apparatus comprising:

an original conveyance unit configured to convey an original so as to be introduced into between a moving document reading glass and a reference member and so as to pass through a moving document reading position, the moving document reading glass and the reference member being disposed to face each other at the moving document reading position;

a reading unit configured to read the original in a main scanning direction through the moving document reading glass when the original passes through the moving document reading position;

a controller connected to a memory, the controller and memory configured to perform:

a first abnormal pixel detection to detect a pixel having a brightness value less than a first abnormal pixel detection threshold value among pixels located at a same main scanning direction position in a plurality of lines, the brightness value being obtained by said reading unit reading the reference member through the moving document reading glass in a state before the original passes through the moving document reading position, said first abnormal pixel detection detecting, in a case where the number of detected pixels is equal to or greater than a first abnormal pixel determination threshold value, a main scanning direction position of the detected pixels as a first main scanning direction position;

a second abnormal pixel detection to detect a pixel having a brightness value less than a second abnormal pixel detection threshold value, the second abnormal pixel detection threshold value being less than the first abnormal pixel detection threshold value, among pixels located at a same main scanning direction position in a plurality of lines, the brightness value obtained by said reading unit reading a leading end portion of the original through the moving document reading glass in a state that the original is being conveyed, said second abnormal pixel detection detecting, in a case where the number of detected pixels is equal to or greater than a second abnormal pixel determination threshold value, a main scanning direction position of the detected pixels as a second main scanning direction position; and a decision to decide the main scanning direction position detected both as the first main scanning direction position and as the second main scanning direction position, as an abnormal main scanning position.

6. The image reading apparatus according to claim 5, wherein the first abnormal pixel detection threshold value is different from the second abnormal pixel determination threshold value.

7. The image reading apparatus according to claim 6, wherein said reading unit has a plurality of line sensors for respective colors, each of the plurality of line sensors outputs a brightness value corresponding to the color, and the second abnormal pixel detection threshold value has different values for respective colors.

8. The image reading apparatus according to claim 5, wherein said first abnormal pixel detection calculates an average value of brightness values of the detected pixel for each first main scanning direction position, and calculates an absolute difference between the brightness value of the leading end position of the original and the average value, and said second abnormal pixel detection detects a pixel of which the brightness value is less than the second abnormal pixel detection threshold value, and of which the calculated absolute difference is equal to or less than the predetermined value.

* * * * *